Aug. 18, 1931.    R. P. M. DAVIS    1,819,740
BRICK MAKING MACHINE
Filed Oct. 11, 1929    2 Sheets-Sheet 1

Inventor
Roy P. M. Davis
By Percy H. Moore
Attorney

Aug. 18, 1931.    R. P. M. DAVIS    1,819,740
BRICK MAKING MACHINE
Filed Oct. 11, 1929    2 Sheets-Sheet 2

Inventor
Roy P. M. Davis
By Percy H. Moore
Attorney

Patented Aug. 18, 1931

1,819,740

UNITED STATES PATENT OFFICE

ROY P. M. DAVIS, OF MOUNT UNION, PENNSYLVANIA

BRICK MAKING MACHINE

Application filed October 11, 1929. Serial No. 399,030.

My invention relates to brick making machines wherein the drop process is used for filling the elongated multiple compartment type of molds now in use.

In the manufacture of standard brick, it is necessary that a wak of mud of very narrow dimensions, compared to its length, be uniformly fed to the molds.

At the present time conveyors carrying buckets of practically square cross section are employed to feed the brick making material to a hopper of elongated cross section which forms the wak which is later deposited in the mold. However great difficulty has been experienced in uniformly filling the hopper due to the fact that the mass of mud of substantially square dimensions, coming from the conveyor bucket does not readily change to the long and narrow dimensions of the hopper. Consequently a properly and uniformly shaped charge would not be fed to or dropped into the mold. In order to obviate these difficulties it has been the practice to drop the material from the hopper to the mold through long chutes or spouts so that the mud will scatter to such an extent that it will change its shape from a heavy square mass to a long, narrow, ribbon-like mass. These chutes clog and cause considerable trouble.

It is the object of my invention to provide a machine in which the shape of the substantially square charge of mud delivered by the conveyor buckets is altered to more nearly conform to the shape of the wak forming portion of the hopper before reaching the latter. Another object of my invention is the provision of means for altering the form or shape of the flowing mass of brick making material without delaying its progress. Further objects will appear from the detail description.

In the accompanying drawings forming a part of this specification:

Figure 1:
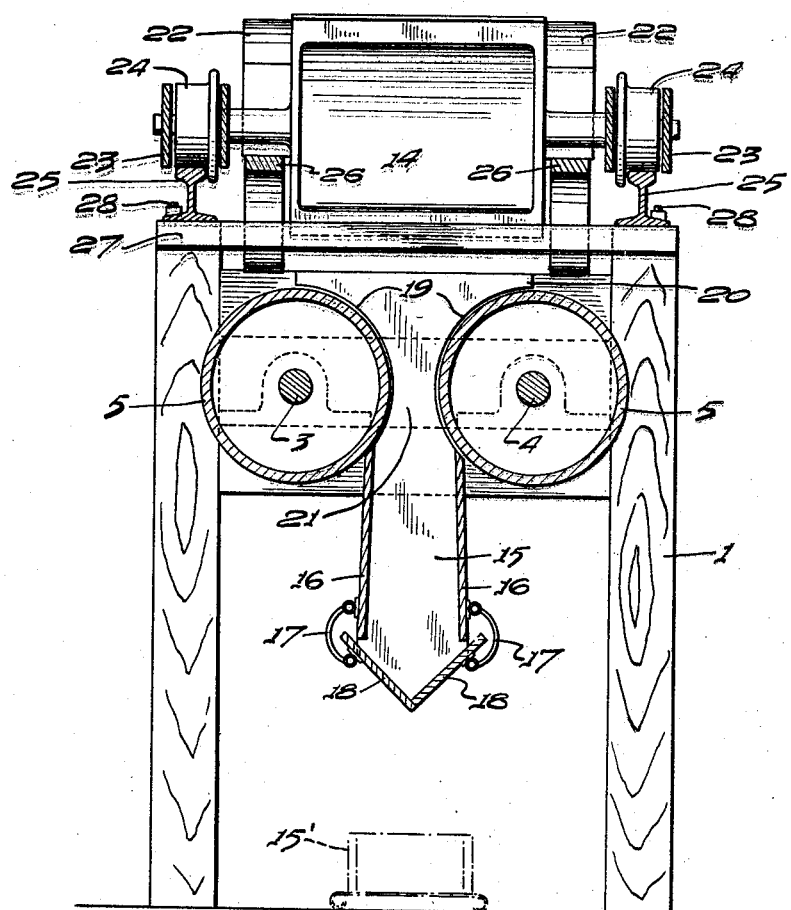
Figure 1 is an end view of a brick making machine partly in cross-section, illustrating my invention.

Referring more particularly to the drawings wherein like reference numerals denote corresponding parts throughout the views, 1 represents a portion of the frame of a brick making machine provided with bearings 2 in which the ends of a pair of longitudinally disposed shafts 3 and 4 are mounted. Drums or rollers 5 affixed in spaced relation to each other upon these shafts are driven by means of miter gears 6 and 7, mounted on adjacent ends of the respective shafts, in position to mesh with miter gears 8 and 9 fixed to a transverse shaft 10. This shaft 10, which is journaled in bearings 11, mounted in the machine frame, is driven by means of a large gear 12 connected to any suitable source of power, not shown.

Mounted in the frame 1 is a hopper 13, for receiving brick making material from conveyor buckets 14, hereinafter described, and periodically dropping its charge of mud into a mold 15′, when the latter is moved to filling position beneath the hopper, by well known means, not shown. The hopper 13 comprises vertically disposed parallel end walls 15 and side walls 16 which diverge slightly in a downwardly direction. Pivotally secured to side walls 16, as by hinges 17, are a pair of downwardly and inwardly extending hopper doors 18, normally maintained in closed position by any suitable means, not shown. The end plates or walls 15 of the hopper which extend between and project above and below the drums 5, are cut away along curved lines 19 and are flared or widened at their upper ends as at 20, so as to form a mouth portion and also extend around and partially over the inner and top adjacent peripheral portions of the drums. The downwardly diverging side walls or plates 16 are cut away between the drums so that the peripheries of the latter extend slightly into the hopper and in effect serve as upper portions or extensions of the side walls. It will thus be seen that material dumped from the buckets 14 will drop into the flared mouth portion 20 of the hopper onto the drums 5 and thence through the contracted space or throat 21 between the drums into the lower downwardly expanding portion of the hopper.

Figure 2:
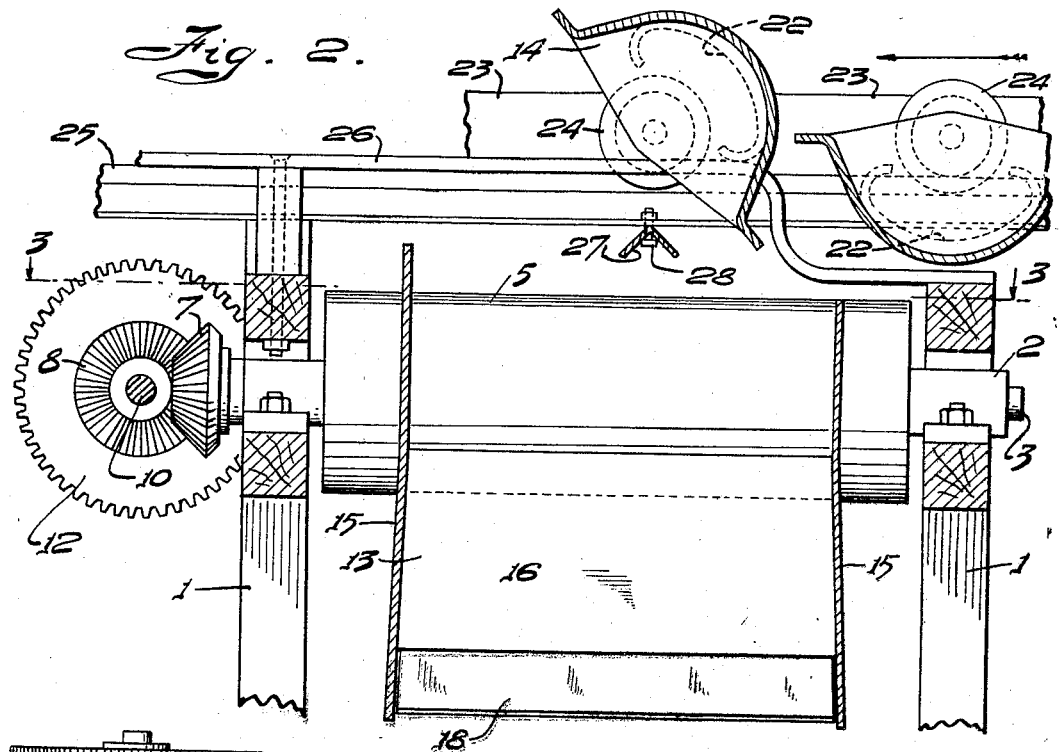
Figure 2 is a side view partly in section.
Figure 3:
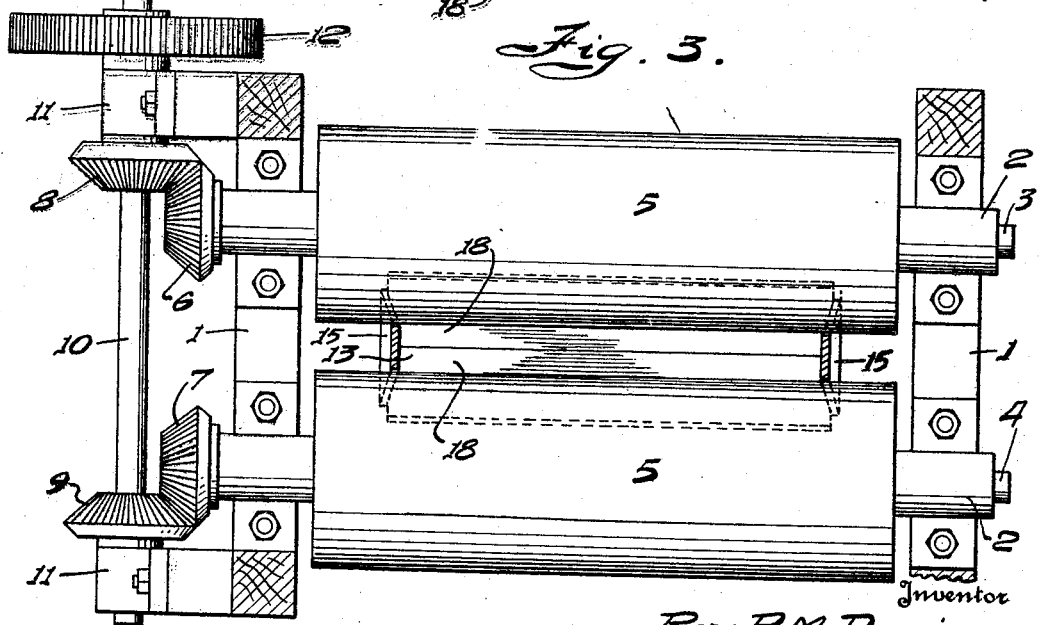
Figure 3 is a plan view taken on the line 3—3 of Figure 2.

As previously explained brick making material or mud is conveyed to a position above and in line with the hopper 13 by means of substantially square conveyor buckets 14, pivotally mounted between link chains 23 driven in any desired manner. Movement of the chains is guided by rollers 24 carried by the chains riding upon rails 25. These buckets are formed at one end with a cam portion 22 which engages and rides over a dump rail 26, which in turn causes the bucket to be tipped or inverted when moved to Figure 2 position.

It is to be noted that the drums 5 are spaced apart a distance slightly less than the distance between the side plates or walls 16 of the hopper and that in consequence the periphery of the drums projects beyond the top edges of the side walls an appreciable distance into the interior of the hopper thus providing the restricted throat portion 21. It should also be noted that the upper end or mouth portion of the hopper is of substantially the same rectangular shape and dimensions as the bucket 14 but that the width of the hopper is gradually contracted into the throat 21 by the curvature of the inner adjacent peripheral faces of the drums and then gradually widened as the peripheries of the drums emerge from the hopper. By virtue of this construction, material dumped from the buckets 14 in a substantially square mass falls upon and is drawn between the oppositely rotating drums into the lower portion of the hopper which is of substantially the same cross section as that of the mold 15'. In the course of its descent the form of the substantially square flowing mass is changed by the drums to elongated or pronounced oblong form in which shape it enters the somewhat similarly shaped but much larger lower or wak forming portion of the hopper. It will be understood that the drums 5 are adapted to be reversely driven so that the adjacent surfaces travel downwardly and consequently pull and compress the flowing mass into the desired shape. As the mass enters the lower expanding portion of the hopper it is progressively free to expand, and consequently the hopper will be completely filled without danger of clogging.

Under some conditions it may be desirable to split and distribute throughout the length of the hopper, the descending mass of material. An inverted V-shaped plate 27 secured to the rail 25, by bolt 28, may be employed for this purpose.

Any suitable means may be employed to trip the gates 18 to permit the wak of mud of desired narrow dimensions to drop by gravity into the mold.

While I have shown the upper or mouth portion and the lower or wak forming portions of the hopper as being joined together it is obviously within the scope of my invention to have the latter separate from and spaced below but in line with the throat portion 21.

Having thus described my invention, what I claim is:

1. In a brick making machine, a hopper having an upper mouth portion and a lower wak forming portion, means for feeding brick making material to the hopper, and intermediate means of substantially greater length than the length of the hopper and having a portion only within the hopper for reshaping the flowing mass of material before it reaches the lower or wak forming portion of the hopper.

2. In a brick making machine, a hopper having a wak forming portion, means for feeding a flowing charge of brick making material to the hopper, and rotating means for altering the shape of said flowing mass before it reaches said wak forming portion of the hopper said rotating means being of substantially greater length than the length of the hopper and having a portion only within the hopper.

3. In a brick making machine, a hopper having a wak forming portion, means for feeding a flowing charge of brick making material to the hopper, and rotating means protruding through the side walls of the hopper into the hopper for altering the shape of said flowing mass before it reaches said wak forming portion of the hopper.

4. In a brick making machine, a hopper having a lower portion thereof of substantially narrow width, material feeding means positioned above said hopper for feeding a substantially square mass of brick making material to said hopper, and means for narrowing the width of said mass before it reaches the lower portion of the hopper said last mentioned means being of greater length than the length of the hopper and having a portion only within the hopper.

5. In a brick making machine, a hopper having a wak forming portion, means for feeding a flowing mass of brick making material to the hopper, a pair of rotatable drums projecting partially into the hopper through the side walls thereof and partially into the path of the brick making material for reshaping and directing the flowing mass to the wak forming portion of the hopper.

6. In a brick making machine, a hopper comprising side and end walls, means for feeding a flowing mass of brick making material to the hopper, the side and end walls of said hopper being cut away, and a pair of spaced rollers, the peripheries of which extend through said cut away portions into the hopper in position to reshape the flowing brick making material as it enters the hopper.

7. In a brick making machine, a hopper having an enlarged material receiving portion of expanding width from top to bottom and a narrow wak forming portion, means for feeding a flowing mass of brick making material to said receiving portion, rotatable means forming a contracted throat between said receiving and said wak forming portion of the hopper, said rotatable means adapted to draw the flowing mass through the throat to reshape and force the same into said wak receiving portion.

In testimony whereof I affix my signature.

ROY P. M. DAVIS.